April 27, 1937.    W. W. SLAGHT    2,078,739
UNIVERSAL JOINT
Filed Nov. 15, 1932    2 Sheets-Sheet 1

INVENTOR
W. W. Slaght
BY
Evans + McCoy
ATTORNEYS

April 27, 1937.  W. W. SLAGHT  2,078,739
UNIVERSAL JOINT
Filed Nov. 15, 1932  2 Sheets—Sheet 2
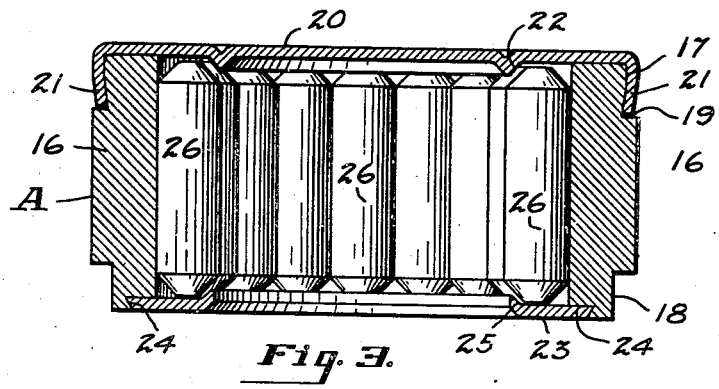
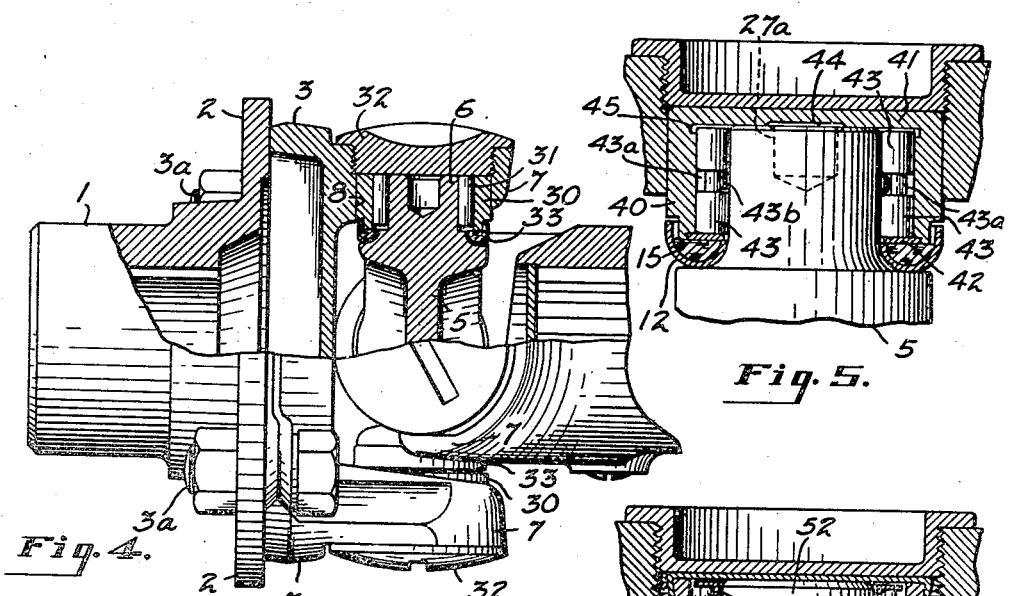
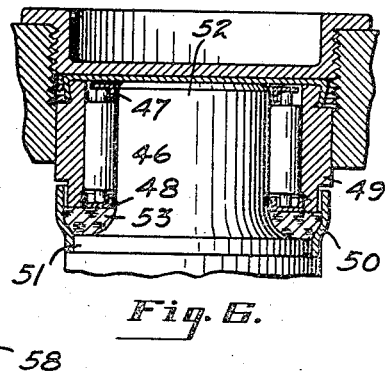
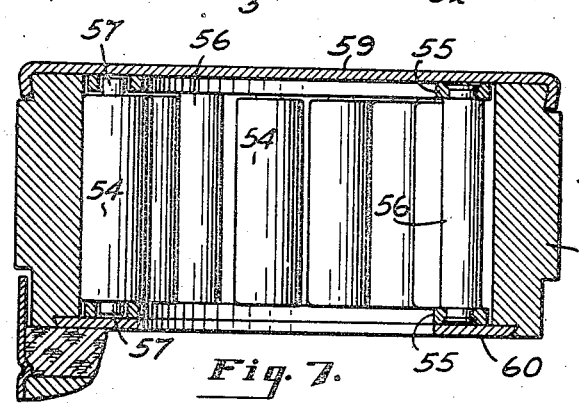
INVENTOR
W. W. Slaght
BY
Evans & McLay
ATTORNEYS Patented Apr. 27, 1937

2,078,739

UNITED STATES PATENT OFFICE 2,078,739

UNIVERSAL JOINT

William W. Slaght, Rocky River, Ohio, assignor to Cleveland Steel Products Corporation, Cuyahoga County, Ohio, a corporation of Ohio Application November 15, 1932, Serial No. 642,713

3 Claims. (Cl. 64—17)

This invention relates to universal joints, and particularly to universal joints having bearings of the so-called anti-friction type.

One of the objects of the present invention is to provide a new and improved universal joint which is simple in construction and which may be readily assembled and disassembled.

Another object is to provide a universal joint which requires a minimum amount of lubrication and which at the same time will withstand continuous operation under severe conditions such as when the members connected thereby are disposed at substantial angles with respect to each other.

Another object is to provide a particularly efficient universal joint with anti-friction bearings held in place in a new and novel manner.

Another object is to provide a new and novel universal joint with a roller unit for the bearings thereof, which unit is of simple yet sturdy construction.

Another object is to provide a roller bearing unit for universal joints with a new and effective means for retaining the individual rollers thereof in proper position.

A further object is to provide a roller bearing universal joint of improved construction which, when once assembled, requires no further lubrication and in which means is provided to prevent dust and other foreign matter from gaining access to the individual rollers.

With the above and other objects in view, the present invention may be said to consist in certain features of construction and combinations of parts which will be readily apparent to those skilled in the art from the following description.

In the drawings which illustrate suitable embodiments of the invention,

Fig. 3 is a greatly enlarged section through one of the bearing units showing the manner of retaining the individual rollers;

Fig. 4 is a view similar to Fig. 1 showing a modified mounting for journaling the trunnions in the universal joint yokes;

Fig. 5 is a fragmentary view showing one of the trunnions and cooperating yoke arm as employing a modified bearing retaining means;

Fig. 6 is a fragmentary view showing one of the trunnions and a cooperating yoke arm as employing a further modified bearing retaining means; and Fig. 7 is a section of a further modified bearing unit showing the ends of the rollers loosely mounted in platelike retaining members.

Figure 1:
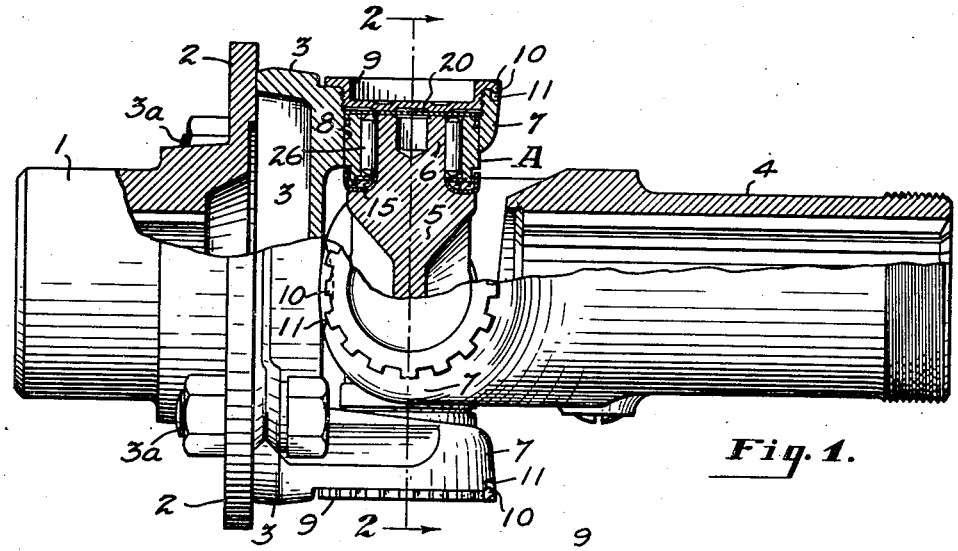
Figure 1 is a full size side elevation of the joint assembly, a portion of the same being broken away and shown in section.

Referring to the accompanying drawings, in which like numerals refer to like parts throughout the several views, the universal joint of the present invention is of the type for transmitting power from one rotating member to another, and particularly for connecting the ends of shafts disposed at an angle to each other or between which there may be angular movement as well as relative longitudinal movement, such as the transmission and propeller shafts of motor vehicles.

In the drawings there is shown a collar 1 having a flange 2 of the type commonly used with and secured to a transmission shaft, a flange yoke 3 secured by bolts 3ª to the flange 2, a splined yoke 4 of the type for slidably receiving one end of a propeller shaft and a joint cross 5 having bearing pins or trunnions 6 arranged at right angles to each other, which cross is the means for connecting one yoke to the other.

The present invention is directed primarily to the method of and means for journaling the trunnions 6 in the arms 7 of the yokes 3 and 4. In the construction shown in Figs. 1, 2 and 3, the parallel arms 7 of each yoke are spaced apart and are provided with coaxial apertures 8 which are larger in diameter than the trunnions 6. These apertures receive the roller bearing units A (to be later described) which fit snugly therein and which are preferably held in place by caps or plugs 9 threaded into the outer ends of the apertures 8. The plugs 9 have tabs or ears 10 at their periphery which may be forced into notches 11 at the edges of the yoke arms 7 to lock the plugs in a proper adjusted position. Although this construction is preferred, it is obvious that the plugs may be secured to the yoke arms by bolts, or they may be mounted in any other suitable manner to hold the bearing units A in place.

Figure 2:
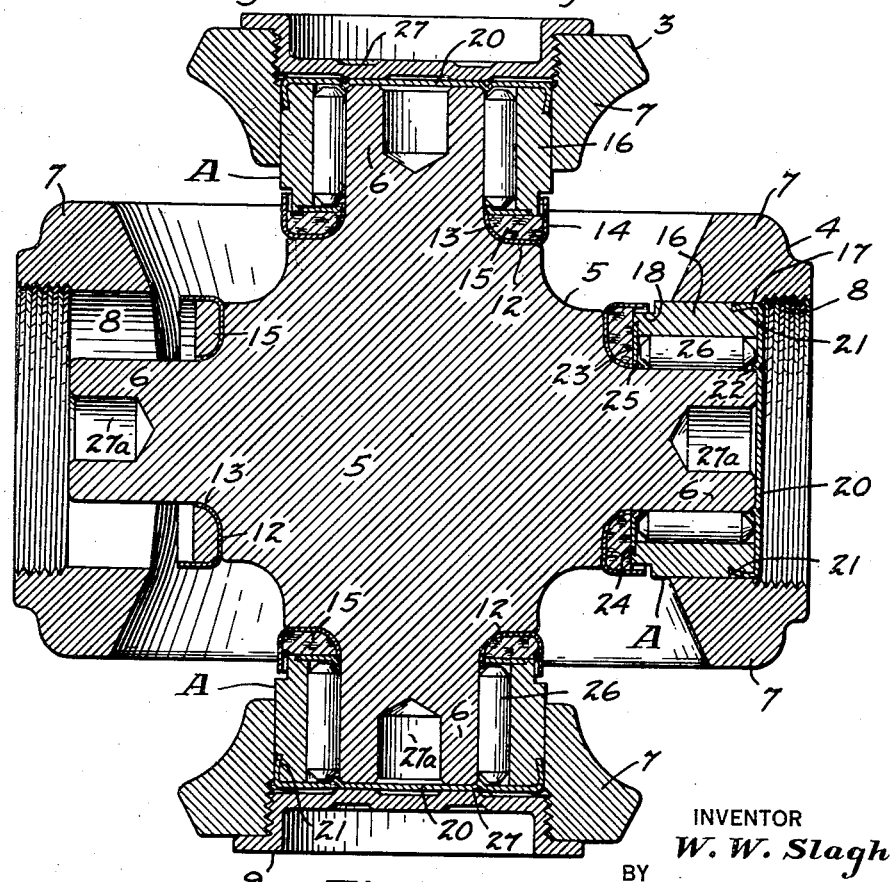
Fig. 2 is an enlarged section taken approximately on the line 2—2 of Fig. 1, some of the parts being omitted to show the manner of assembling the roller bearing units to the trunnions and joint yokes.

In order to insure the exclusion of dirt and other foreign matter from the bearings, it is preferred to employ a protective device comprising an annular cup-shaped member 12 which is seated closely about the base of the trunnion 6 and, if desired, it may be forced onto the trunnion with a press fit. The metal of the joint cross at the base of each trunnion 6 is arranged to form a suitable seat for the member 12 which for convenience may be called a dust slinger. This member, as shown in Fig. 2, is in the form of an annular stamping having an inner axial portion 13 and an outer axial flange 14 overlapping with the bearing unit A in close relation.

A suitable resilient seal 15 of cork, composition or other suitable sealing material is carried within the dust slinger 12 to resiliently engage the bearing unit A to assist in excluding dust, dirt and other objectionable material, and to also assist in retaining what little lubricant is employed for the bearing unit. As shown in Figs. 1 and 2, a dust slinger 12 of the character just described is used for each trunnion 6. It is obvious that other shapes of dust slingers may be employed to accomplish the same purpose.

Each bearing unit A employed to journal the trunnions 6 in the arms of the joint yokes is new and novel in construction and comprises a cylindrical bearing ring 16, the ends of which are of reduced outside diameter at 17 and 18 to provide shoulders 19. The outer end 17 of the ring is preferably closed in in a permanent manner by means of a cover plate 20 comprising a cup-shaped stamping, the circumferential flange 21 of which fits over the reduced end 17 of the bearing ring and is securely clamped about the same. To accomplish this and in order to provide an oil seal, the end 17 of the ring may gradually increase in diameter outwardly from the shoulder 19 to provide a dovetail effect so that the flange 21 of the plate 20 may be securely clinched into position by a rolling, spinning, pressing, or other suitable clinching operation. The closure plate 20 radially inwardly of the inner wall of the bearing ring 16 is formed with an annular shoulder 22 which is coaxial with the bearing ring 16. The opposite end of the bearing ring 16 is also partially closed in by an annular closure plate 23 which is preferably pressed into a counterbore 24 so that it will be positioned flush with the end 18 of the bearing ring. The inner circumferential edge of the closure plate 23 is depressed axially inwardly to provide a shoulder 25 coaxial with the shoulder 22 of the other end plate 20. In the assembly the shoulders 22 and 25 lie intermediate the end planes of the bearing ring and incline toward each other, the angle of inclination of each shoulder being substantially of the same degree as the tapered or chamfered ends of the individual rollers 26 which are disposed within the ring 16 between the plates 20 and 23. These rollers 26 are arranged in the ring or cage 16 with a slight clearance relative to each other and with a clearance relative to the end plates 20 and 23 so that they may have a slight endwise movement. The bearing unit A just described provides a self-contained unit which can be economically manufactured and easily assembled, and the oppositely disposed shoulders thereof serve as an efficient means for retaining the individual rollers 26 in proper position when the bearing unit is disassembled from the universal joint. The end of each trunnion 6 is recessed at 27ᵃ to provide a chamber for holding lubricant. However, since the bearings are of the roller type a very small amount of lubrication is required and the universal joint can be subjected to severe continuous use over a long period without requiring further lubrication.

The joint construction just described is so designed as to provide for rapid and easy assembly. After the bearing unit is assembled it is preferably ground externally to insure that the outer surface of the ring 16 and closure plate flange 17 will fit properly in the opening 8 of the yoke arm, which opening is also preferably ground to size.

In assembling the parts of the universal joint of the present invention the dust slinger stampings 12 are first fitted over the trunnions 6 of the joint cross 5 to properly seat at the base of the trunnions, the sealing element 15 being positioned therein, as shown by the left horizontal trunnion 6 as viewed in Fig. 2. Then a yoke is positioned so that the opposed trunnions 6 can be disposed within the openings 8 of the yoke arms 7, the openings being of sufficient size to permit the cross to be inserted at an angle to enter first one trunnion and then the other trunnion in the respective apertures. The bearing units A are then assembled to the joint by inserting them in the yoke arm apertures 8 coaxially with the trunnions 6 so that the trunnions abut the closure plates 20, which plates are preferably hardened to withstand end thrust and end bearing engagement. In this position, as shown by the right horizontal bearing unit in Fig. 2, the trunnion is completely surrounded by the individual rollers 26. The closure plugs 9 are then threaded into the openings 8 and properly adjusted to provide the desired engagement between the ends of the trunnions 6 and the closure plates 20. When the desired adjustment of the bearing units is obtained one of the ears 10 on the plug 9 is bent into the recess 11 at the edge of the yoke arm to lock the plug 9 in its adjusted position. The next step is to then assemble the other yoke to the cross, this operation being the same as previously described.

In the closure plugs 9 shown in the drawings, the closing portion or web thereof is formed with an annular embossed projection 27 which is of approximately the same diameter as the trunnion so that the forces due to end thrust will be transmitted through the plate 20 to the annular projection 27 which reinforces the plug 9 and thence to the yoke arm.

Before the assembly of the bearing units to the trunnions a desired quantity of lubricant is placed in the openings 27ᵃ which lubricant will be sufficient to lubricate the rollers thereof over a relatively long period of time. It will be noted in the enlarged assembly view of Fig. 2 that the end plates 20 of the bearing unit abut against the ends of the trunnions 6 and that the other end plates 23 seat against the cork sealing material 15. This, together with the fact that the flange of the end plate 20 is preferably rolled against the reduced end 17 of the bearing ring 16, provides an effective and efficient seal for the lubricant. In order to further insure the sealing of lubricant, shellac or other similar material may be interposed between the plate 20 and the end of the bearing ring 16 before the flange 21 is rolled in place. It is obvious that since a rolling action is obtained through the use of the rollers 26 a very small amount of lubricant is required. The arrangement of the lubricant seal and the overlapping position of the dust slinger relative to the bearing ring insures the exclusion of dust and dirt from the rollers 26 of the bearing unit.

The construction of the various parts of the joint which are relatively few, is such that the parts subject to wear by the action of the rollers 26, namely the trunnions and inner wall of the bearing ring, can be accurately ground to provide the proper desired fit for the rollers 26.

In the modified construction of Fig. 4 a different arrangement is provided in which the end plates of the bearing unit may be omitted. In this construction the joint cross 5 is positioned with its trunnions inside the openings of the yoke arms 7 and an annular ring 30 is forced with a press fit into the openings of these yoke arms. Then a plurality of individual rollers 31 are positioned in the space between each trunnion 6 and the inner wall of the surrounding bearing ring 30. In order to hold the rollers 31 within this space and to take care of the end thrust of the joint cross 5, suitable caps 32 are threaded into the ends of the apertures of the yoke arms 7. In this construction a suitable seal 33 of cork or other desirable material is provided to bear against the lower end of the sleeve 30, as indicated in Fig. 4. As shown in this view the caps 32 serve as the means for holding the bearing ring 30 in place for preventing excessive endwise movement of the rollers 31 and for taking the end thrust of the cross directly from the trunnions 6.

In the modification shown in Fig. 5 the bearing unit comprises a bearing ring 40 having a closed end 41 which may be integral therewith as shown, or if desired may be of two pieces as in the construction previously described. The open end of the ring 40 is partially closed in by an annular washer 42 securely seated in the counterbored end, which washer surrounds the cooperating joint trunnion 6.

As in the construction previously described, a plurality of small diameter rollers 43 are arranged circumferentially within the ring 40 to provide the bearing between the trunnion 6 and bearing ring 40. These rollers 43 are slightly shorter than the inner wall of the bearing to permit slight end play of the rollers in order to prevent binding. In order to assist in lubrication the end portion 41 is preferably recessed at 44 substantially coaxial with the lubricant chamber 27ª of the trunnion and, furthermore, a circumferential recess 45 is formed in the inner wall of the bearing ring 40 adjacent the end 41 to receive lubricant thrown out by centrifugal force to assist in the lubrication of the rollers 43. In this modified construction, the dust slinger 12 and sealing ring 15 previously described are employed. However, equivalent means for performing the same function may be used.

In this modified construction the rollers 43 are each formed with an annular groove 43ª intermediate the ends, the groove in each roller being in line with the grooves of the others for the reception of a retaining ring 43ᵇ of greater diameter than the trunnions 6. When the bearing unit is assembled the retaining ring 43ᵇ which may be split if desired for ease of assembly serves to prevent the individual rollers from being inadvertently dislodged from the bearing ring 40. However, when the bearing unit is assembled to the trunnion the retaining ring 43ᵇ has a slight clearance relative to the bottoms of the grooves 43ª in order to avoid friction. This retaining ring may be circular in cross section or may be rectangular in cross section as shown in Fig. 5 or of any other suitable shape.

It is, of course, understood that one such bearing unit is employed for each trunnion 6 of the universal joint cross.

In the construction shown in Fig. 6 the rollers 46 are retained at one end by a loosely positioned ring 47 of L-shaped sections and at the other end by a ring 48 of U-shaped cross section pressed into the bearing ring or sleeve 49.

There is also shown in this construction a modified dust slinger 50 which is in the form of a sleeve fitted about a shouldered portion 51 of the cross and overlapping the bearing sleeve 49. This permits the oil seal 53 to seat directly against the body of the cross and form an efficient seal.

In all the constructions previously described the rollers used are of relatively small diameter and are of the cageless type. In Fig. 7 there is shown a construction in which the rollers 54 are of the cage type. The cage comprises a pair of annular disks 55 held in properly spaced position by a suitable number of stay bars 56. The ends 57 of the rollers 54 are received in enlarged slots in the disks 55. The cage and rollers may be mounted in a sleeve 58 which is closed at one end by a plate 59 and at the other end by an annular closure member 60, or, if desired, the cage and rollers may be substituted for the rollers 31 of the joint, illustrated in Fig. 4.

In the constructions shown in the drawings, the particular arrangement of the various parts of the joint described provides a relatively small sized construction which is light in weight, as evidenced from Fig. 1, which is a full sized view of a joint suitable for use in the majority of passenger motor vehicles.

Furthermore, it is to be understood that the particular form of apparatus shown and described is presented for purposes of explanation and illustration and that various modifications of said apparatus and procedure can be made without departing from my invention as defined in the appended claims.

What I claim is:

1. In a universal joint, a trunnion bearing unit comprising a cylindrical sleeve having an end of reduced diameter, a closure plate having a peripheral flange fitting closely against said reduced end, an annular closure plate carried at the other end of said sleeve and having a trunnion receiving aperture, a plurality of individual rollers positioned between said plates each having projecting ends, and inwardly extending annular roller retaining shoulders on said plates for cooperation with the projecting ends of said rollers to hold said rollers in assembled relation in said sleeve prior to assembly of the sleeve to the joint.

2. In a universal joint, a trunnion bearing unit comprising an annular sleeve, the external surface of said sleeve at one end having a recess of gradually increasing depth, a plate to close in the opening at said end, said plate having a peripheral flange seated in said recess and interlocked with the bottom thereof, an annular plate partially closing the opening at the opposite end of said sleeve, said plates having inwardly extending annular roller retaining shoulders, and a plurality of individual rollers positioned intermediate said plates, said shoulders holding said rollers in assembled relation in said sleeve prior to assembly of the sleeve to the joint.

3. In a universal joint, a trunnion bearing unit comprising an annular sleeve, the outer surface of said sleeve at one end having a circumferential recess of gradually decreasing depth, a plate extending across said end and having its marginal edges clinched into said recess, said plate having an embossed annular shoulder coaxial with and extending into said sleeve, an annular plate secured to said sleeve at the opposite end thereof, said last plate also having an annular shoulder lying within said sleeve, and a plurality of rollers positioned within said sleeve between said plates, said shoulders preventing said rollers from dropping out of said sleeve prior to assembly of said sleeve to the joint.

WILLIAM W. SLAGHT.